Dec. 5, 1967     G. C. M. CABAU     3,356,598

PROCESS FOR THE FABRICATION OF SPECIALLY CONTOURED ELECTRODES

Filed Feb. 8, 1965

United States Patent Office

3,356,598
Patented Dec. 5, 1967

3,356,598
PROCESS FOR THE FABRICATION OF SPECIALLY CONTOURED ELECTRODES
Georges Clement Marcel Cabau, Neuilly-sur-Seine, France, assignor to Societe d'Exploitation des Materiels Hispano-Suiza, Bois-Colombes, Seine, France, a society of France
Filed Feb. 8, 1965, Ser. No. 431,112
Claims priority, application France, Feb. 13, 1964, 963,718
7 Claims. (Cl. 204—15)

This invention relates to the fabrication of electrodes, particularly for use in various electrical processes where it is desired to produce a uniform effect over at least a portion of the surface of an irregularly shaped object. More specifically, the present invention concerns a process for fabricating a sheet electrode whose surface contours correspond closely to those of a selected surface portion of an object, which portion is to be subjected to some electrolytic procedure, such as electroplating or electrolytic etching.

It is an object of this invention to permit a rapid, simple and inexpensive fabrication of such electrodes.

It is another object thereof to permit their fabrication by means of simple and inexpensive apparatus.

Yet another object herein is to provide a process for their fabrication which may be performed by relatively unskilled workers.

The process of the present invention comprises the principal operations of causing a layer of a first material of relatively uniform thickness to conform closely to the irregularities in the surface portion to be treated, causing a mass of a second material to completely cover the first material in such a way as to conform closely to the irregularities both in the outer surface of said first material and in a region of the surface of the object surrounding the surface portion to be treated, causing said second material to harden so as to constitute a cast, separating the two materials from the object and from each other, and forming a sheet electrode on the portion of said second material which bears the impression of said layer of first material.

According to an auxiliary feature of the invention, passages are formed in the mass of second material, or between this mass and the object to be treated, for the flow of electrolytic fluid between the electrode and the surface to be treated.

According to another feature thereof the thickness of said first material is substantially equal to the desired distance between the sheet electrode and the surface to be treated, and the portions of the second material which conform to the irregularities in the region surrounding the surface to be treated serve as a support and spacing unit between the electrode and the surface to be treated.

When the sheet electrode is thus made to follow variations in the surface to be treated, it is possible to achieve a far more uniform electrolytic action across said surface.

These and other objects, features and advantages of the present invention will become more readily apparent from the following detailed description when taken together with the attached drawings, in which.

Referring first to FIGS. 1 to 4, it may be appreciated that the present invention is concerned with the fabrication of an electrode whose surface contours conform to those of a selected portion of the surface of a piece 1. In order to achieve this result, a sheet, or stack of sheets, 2 is placed over the selected portion of surface $1_a$. This sheet, which originally has flat upper and lower surfaces and a rigorously uniform, predetermined thickness E, is made of a material which is sufficiently deformable to permit it to conform closely to the contours of surface $1_a$ when forced thereagainst by the application of any suitable force produced, for example, by means of a liquid or gas under pressure. Yet the sheet is relatively incompressible so that it maintains its uniform thickness E. The sheet 2 may then be subjected to a treatment which serves to diminish, or completely destroy, its deformability so that it will preserve the form given it by its application against surface $1_a$. However, this operation only has the effect of insuring the proper performance of the ensuing process steps and, as a result, is not indispensable.

Figure 1:
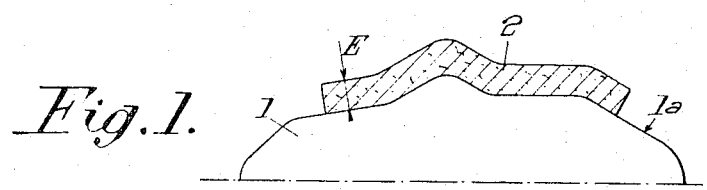
FIGS. 1 to 4 are cross-sectional views of an arrangement in various stages of fabrication formed according to the present process.
Figure 2:
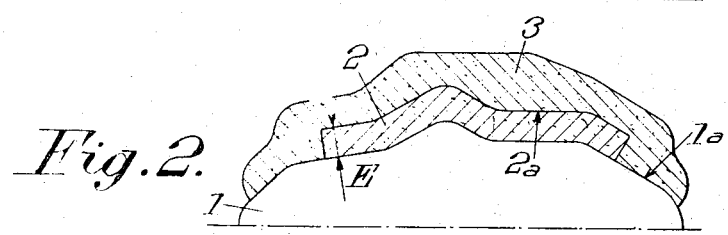

Next, there is applied, as shown in FIG. 2, over the combination of piece 1 and sheet 2, a mass 3 of a second material intended to serve as a support for the electrode. This mass is made deformable enough to conform closely to the contours of the outer surfaces of sheet 2 and of a limited portion of surface $1_a$ surrounding the portion covered by piece 2. Mass 3 may be made of a material which spontaneously conforms to these surfaces or it may be such that a certain amount of force must be applied to produce this result. Mass 3 may also be formed so as to be limited by the borders of sheet 2.

The mass 3 is then subjected to an operation which causes it to harden so that it forms a cast of the surfaces against which it bears.

Figure 3:
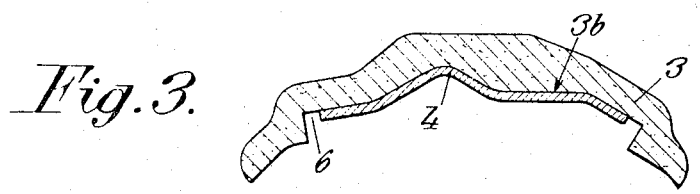

Mass 3 and sheet 2 are then separated from object 1 and from each other and, as is shown in FIG. 3, a thin, uniform coating 4 of conductive material is applied to the surface $3_b$ which was formed by contact against outer face $2_a$ of sheet 2 and which conforms, as a result, to the contours of said selected portion of surface $1_a$. Since coating 4 is both thin and uniform, its outer surface substantially duplicates surface $3_b$ of mass 3 and hence said selected portion of surface $1_a$.

Figure 4:
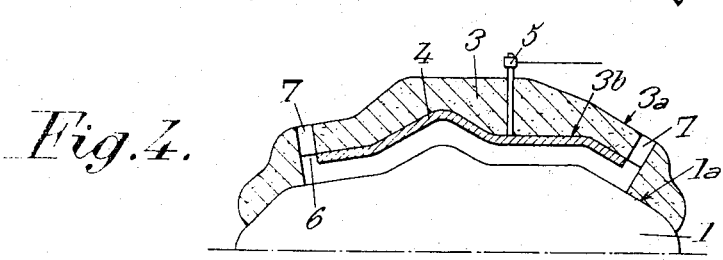

Next an electrical terminal 5 is connected to coating 4, as shown in FIG. 4, so that this coating can be made to function as an electrode.

As is also shown in FIG. 4, mass 3 may be repositioned on object 1, in the same position as it formerly occupied, so as to function as a spacer and support for electrode 4, which support maintains electrode 4 opposite said selected portion of surface $1_a$, this portion of course being that which is to be treated, in such a way that every point on electrode 4 is equidistant from a respective corresponding point on said selected portion. In other words, a space of uniform thickness exists between electrode 4 and surface $1_a$.

This arrangement has the obvious effect of causing substantially all of said selected portion of surface $1_a$ to be uniformly acted on when an electrolytic process is carried out by the passage of an electric current between electrode 4 and object 1.

With respect to electrode 4, it has been found desirable to not extend it completely to the edges of the surface $3_b$ on which it is formed, but to leave a peripheral region 6 uncoated. The purpose of this region is to provide a place for a plurality of passages 7 providing communication between the outer surface $3_a$ and the inner surface $3_b$ of mass 3.

In addition to providing a support for electrode 4, the portion of mass 3 which bears against surface $1_a$, because it conforms to the irregularities in this surface, serves to isolate the region between electrode 4 and said selected surface portion from the surrounding medium. This characteristic can be taken advantage of to produce a very simple treating apparatus wherein mass 3 is made of an electrically insulating material which is clamped against object 1, with the unit composed of elements 1 and 3 being immersed in a container filled with a suitable electrolyte. With a D.C. source connected between object 1 and terminal 5 and with passages 7 permitting electrolyte to circulate between electrode 4 and the surface to be treated, the electrolyte is heated by the passage of current so that a convection motion is established which assures a continuous flow of the electrolyte through passages 7.

Because the size and shape of electrode 4 determine the extent of surface $1_a$ which will be treated, the size of region 6 must be taken into account in the design of sheet 2.

It should be appreciated that mass 3 should be made of a material whose chemical properties are compatible with the composition of the electrolyte and the nature of the electrolytic process envisaged.

In order to complete the description of the above embodiments of the present invention, it would be useful to cite a few non-limitative examples of materials which may be used for the various elements of the above-described assemblage.

Referring first to the material which may be used to form sheet 2, it should be recalled that this element will never come in contact either with the electrolyte or the electrode. Some examples of the many materials from which this sheet 2 can be made are: felt impregnated with plaster which, when wet, may be applied against object 1 and then be permitted to dry while maintaining the form which it had assumed; wax which may be heated for application against surface $1_a$ and then hardened by cooling after it has assumed the desired configuration; and glass fibers impregnated by a synthetic varnish, the whole having the property of hardening as it dries.

The support mass 3 must be made of a material which can remain inert even when plunged in the electrolyte and which will not react with the electrode deposited thereon. Therefore, the choice of this material will be a function of the composition of the electrolyte and the electrode to be used. Several of the materials from which support mass 3 may be made are: staff (plaster combined with fibrous material), a substance which has the property of being workable when first mixed with water and which then hardens as it dries; or fabric impregnated with epoxy resin, "Araldite" for example, which hardens as it dries; or polyester which is workable when hot and sufficiently rigid, when cold, to fulfill the function of mass 3.

Insofar as concerns the conductive material of coating 4, it should present electrical properties consistent with the intended process and it must, of course, be chosen as a function of the chemical compositions of both the electrolyte and the object 1. Bearing these criteria in mind, it has been found that the following materials provide some examples of those which may be used: graphite applied against surface $3_b$ by painting, by the cementing of a sheet thereof, or by electrodeposition, this material being usable with any type of electrolyte; metals such as iron or nickel electrolytically deposited on surface $3_b$, this latter surface having previously been covered with a metallic conductive paint, this arrangement being useful with alkaline electrolytes intended for attacking light alloys; malleable materials, such as lead, which are placed directly against surface $3_b$ and which may be held there by cementing or any other suitable means, this material being useful with sulphuric or chromic electrolytes intended to attack or to chrome-plate steels.

For the last mentioned case, it would be possible to place the material 4 on sheet 2 before applying mass 3 to the ensemble of object 1 and sheet 2.

Insofar as concerns the thickness E of sheet 2, which thickness determines the final separation between electrode 4 and piece 1, its value is determined in accordance with standard electrochemical practice and, in addition to other considerations, on the basis of the nature of the process to be performed, the composition of piece 1 and the dimensions of piece 1. If, for example, it were desired to remove material for a depth of several millimeters at the level of the central portion of the main strut of a landing gear, the thickness E would be around 10 mm.

Figure 5:
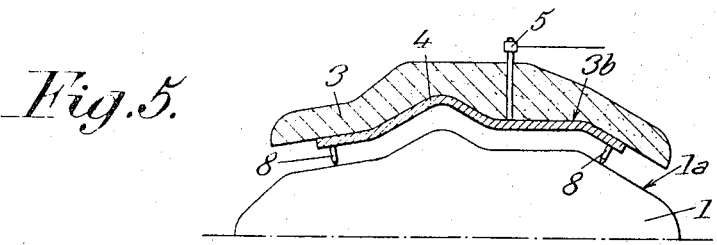
FIG. 5 is a cross-sectional view of a second form which the product of the present process may take; and, FIG. 6 is a cross-sectional view of an electrolysis apparatus employing an electrode arrangement formed according to the present invention.

It should be added, moreover, that in the case of an electrochemical removal of material, it would be possible to eliminate the portions of mass 3 which bear against the piece 1, these portions serving to maintain electrode 4 at the required distance from surface $1_a$. These portions may then be replaced by several feet 8 made of electrically insulating material and arranged, for example, as shown in FIG. 5, around the perimeter of sheet electrode 4. Preferably, the lower end of each foot 8 is relatively tapered so as cover as small an extent as possible of surface $1_a$. It may be appreciated that with such an arrangement, as material is removed from surface $1_a$, feet 8 and electrode 4 descend so as to maintain the distance between the electrode 4 and the surface being treated at a constant value. All other considerations being equal, this procedure permits the duration of treatment to be noticeably reduced.

Figure 6:
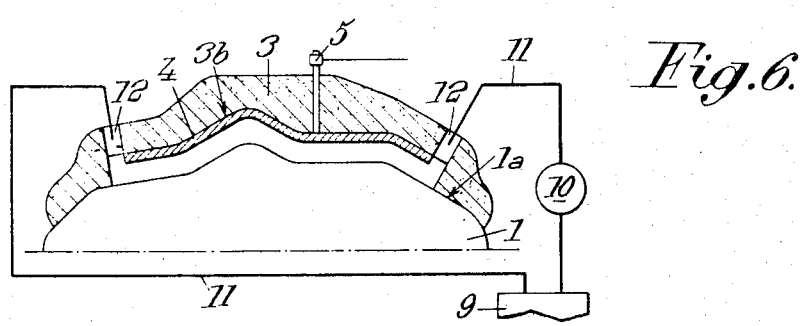

Finally, it should be noted that the use of a sheet electrode formed and mounted in accordance with the present invention permits, as shown in FIG. 6, an electrolytic process to be performed without immersing the entire unit in the electrolyte. In effect, it is only necessary to assure, with the aid of any suitable means if necessary, that the pheripheral portions of mass 3 form a tight contact with object 1, and to circulate electrolyte stored in reservoir 9, for example by means of a pump 10 driving fluid through conduits 11 to passages 12, through space 3. This arrangement yields a simple and portable electrolytic treatment arrangement which could prove invaluable in many situations. One such situation would exist if it were desired to perform an electrolytic process on a portion of a surface of a relatively large or heavy piece. With the arrangement of FIG. 6, such a treatment could be carried without moving the piece. This arrangement could also be used where it is desired to treat a small piece which is already mounted in a large assembly and which cannot be easily removed.

While several preferred embodiments of the present invention have been shown and described herein, it should be appreciated that many variations and modifications can be made thereto without departing from the spirit of the invention, whose coverage should therefore be limited only by the scope of the attached claims.

What I claim is:

1. A method of fabricating an electrode for use in an electrolytic process in which it is desired to produce a uniform effect over an irregular surface portion of an object, said method comprising the steps of: causing a deformable sheet of uniform thickness to conform closely to the irregularities in said surface portion so that the outer surface of said sheet substantially duplicates said surface portion; covering said outer surface of said sheet with a mass of hardenable material so as to cause one surface thereof to conform closely to the irregularities in said outer surface of said sheet, causing said material to become rigid; separating said sheet and said mass from said object and from each other; and covering at least a part of said one surface of said mass with a conductive sheet of uniform thickness in such a way as to cause said conductive sheet to conform closely to the irregularities in said one surface of said mass.

2. The method of claim 1 wherein said step of covering said outer surface of said sheet includes covering a part of the surface of said object surrounding said surface portion covered by said sheet in such a way as to cause a second surface of said mass to conform closely to said part of said object surface, said second surface being intended to support said mass, after it has become rigid, upon said object during the performance of said electrolytic process.

3. The method of claim 2 comprising the further step of forming passages through said mass in such a way that they communicate with said conductive sheet.

4. An electrolytic process which comprises mounting an electrode fabricated by the process of claim 3 on said object in such a way that said second surface of said mass contacts said part of said object surface whose form it duplicates and forms a liquid-tight joint therewith, inducing electrolyte circulation by introducing said electrolyte between said conductive sheet and said surface portion through one of said passages and withdrawing it through another one of said passages and passing an electric current through said electrolyte between said conductive sheet and said object.

5. An electrolytic process which comprises mounting an electrode fabricated by the process of claim 1 on said object in such a way that said conductive sheet is opposite said irregular surface portion whose form it duplicates; connecting a source of electric current between said conductive sheet and said object; and circulating an electrolyte between said conductive sheet and said irregular surface portion.

6. A method according to claim 1 comprising the further step of making the thickness of said deformable sheet equal to the separation desired between said conductive sheet and said surface portion of said object during the performance of said electrolytic process.

7. A method according to claim 1 wherein said step of causing a deformable sheet to conform to said surface portion includes the operation of hardening said sheet so as to cause it to retain the form thus assumed.

References Cited
UNITED STATES PATENTS

| | | | |
|---|---|---|---|
| 1,765,320 | 6/1930 | Bart | 204—15 |
| 3,095,364 | 6/1963 | Faust | 204—143 |
| 3,240,685 | 3/1966 | Maissel | 204—224 |

JOHN H. MACK, *Primary Examiner.*

T. TUFARIELLO, *Assistant Examiner.*